H. B. RECORD.
Tree-Protector.
No. 35,471.
Patented June 3, 1862.
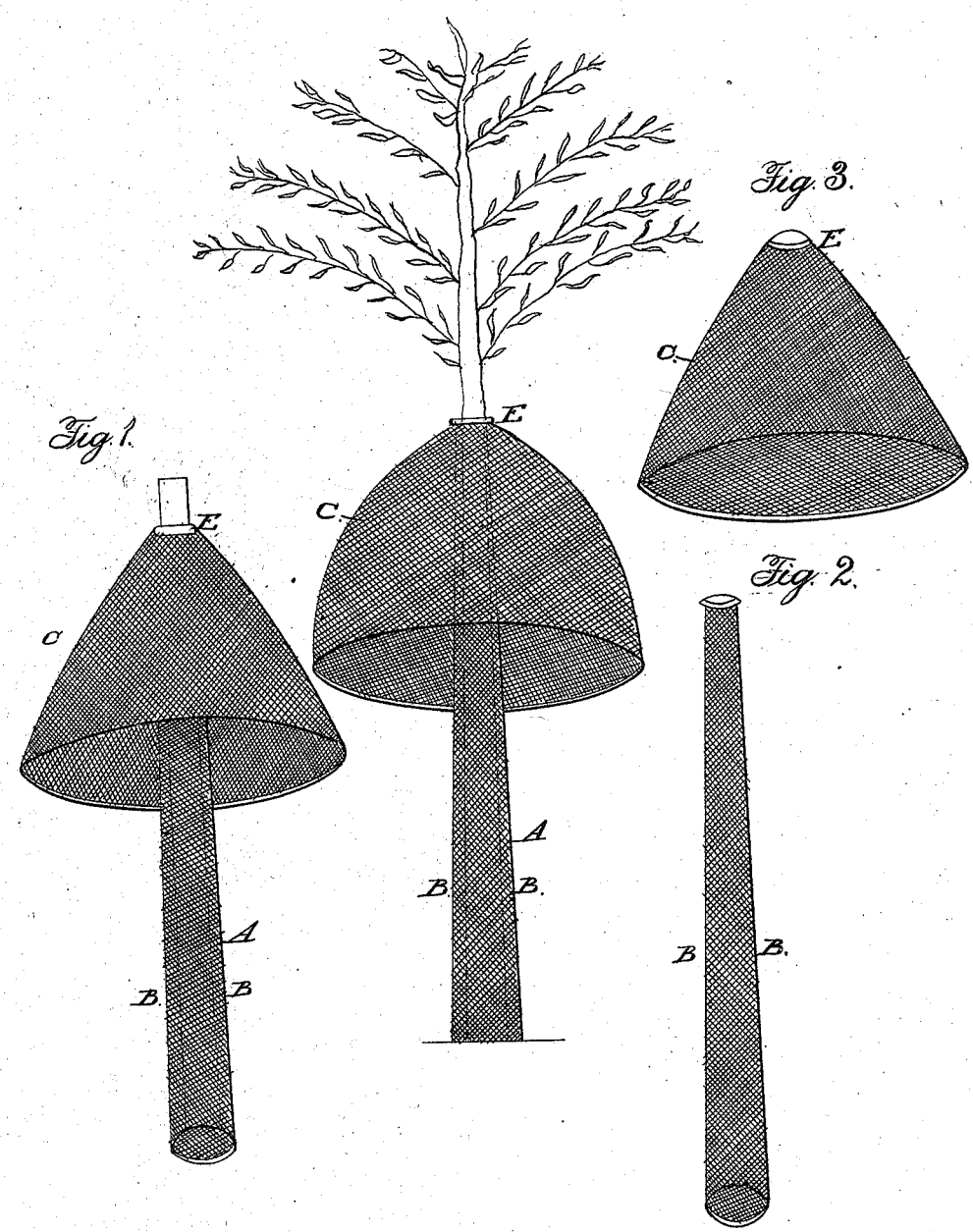

UNITED STATES PATENT OFFICE.

HOMER B. RECORD, OF TURNER, MAINE.

IMPROVEMENT IN TREE-PROTECTORS.

Specification forming part of Letters Patent No. 35,471, dated June 3, 1862.

*To all whom it may concern:*

Be it known that I, HOMER B. RECORD, of Turner, in the county of Androscoggin and State of Maine, have invented a new and improved mode of protecting fruit-trees from destruction by mice, borers, and other insects by the use and means of an article which I denominate a "Tree-Protector;" and I do hereby declare that the following is a full and exact description thereof, reference being had to the accompanying drawing, and to the letters of reference marked thereon.

The nature of my invention consists of two parts connected together by a small wire, one part of which I call the "shield" and the other part the "bonnet," the shield preventing the mice, borers, and other insects from access to the body of the tree, while the bonnet prevents them from ascending into the top or branches thereof.

To enable others skilled in the art pertaining to my invention to make and use my tree-protector, I will proceed to describe its construction and operation.

I construct the shield (see letters B B on accompanying drawing) of wire-cloth, light canvas, or of what may be equivalent. I cut my cloth so as to go about once and one-third of the way around the tree which is to be protected, and to cover the tree about one foot in height, slightly enlarged at the bottom, so as to give it a conical form when applied to the tree, said tree being marked A on drawing, thus giving a free circulation of air between the tree and shield. The top part of the shield is provided with an elastic band somewhat longer than the part of the shield to which it is attached and expands with the growth of the tree. This band is carried around the tree and fastened with a hook or button. This elastic band I generally compose of india-rubber, as it is preferable to steel or any other substance. Steel will rust, but rubber is impervious to water. Besides, it holds the shield closely around the tree, (thereby preventing insects from passing between the tree and shield,) and, being elastic, will not girdle the tree. Around the bottom of the shield, and upon the outer edge of the same, I insert a copper wire, so as to keep it in place. I make my shield having regard to the size of the tree and place it around the same, the bottom being about one inch below the surface of the ground. I then put a small quantity of sand around the base on the outside. This will successfully prevent the operation of mice or the borer.

I construct the bonnet (see letter C on drawing) of the same material of the shield, or its equivalent, in the form of a cone and attached to the shield by a small wire. This, too, is supplied with an elastic band, (see letter E on drawing,) so as to expand with the growth of the tree, which band passes around the tree and fastens in the same manner as the shield, either by hook or button. The concave or under side of the bonnet is smeared with tar, and then a suitable quantity of cotton or its equivalent is applied, which will adhere to the tar or bonnet. This is a perfect guard against caterpillars, ants, and other insects. These insects, as they ascend the tree, will come in contact with the cotton, and in their effort to ascend they will become entangled in the mass of cotton, and they and their larvæ will perish together.

Having thus arranged and placed my tree-protector in the desired position for the protection of my trees, I then cover or smear the upper side of the bonnet with tar to make it more durable and prevent the rain from penetrating through to the cotton.

What I claim as my invention, and desire to secure by Letters Patent, is—

The shield and bonnet made, constructed, and used in manner and form substantially as herein described.

H. B. RECORD.

Witnesses:
 JOHN DILLINGHAM,
 JOB PRINCE.